US012808454B2

(12) United States Patent
Karamanos et al.

(10) Patent No.: US 12,808,454 B2
(45) Date of Patent: Nov. 24, 2026

(54) TECHNIQUES FOR UNIVERSALLY DETECTING OR MITIGATING FLUID FLOW MEASUREMENT ERRORS

(71) Applicant: Best Technologies, Inc., Reno, NV (US)

(72) Inventors: John C Karamanos, San Jose, CA (US); Jose Luis Rodriguez Perez, Athens, TX (US); Timothy Buford Briggs, Canton, TX (US)

(73) Assignee: Best Technologies, Inc., Reno, NV (US)

( * ) Notice: Subject to any disclaimer, the term of this patent is extended or adjusted under 35 U.S.C. 154(b) by 0 days.

(21) Appl. No.: 18/929,131

(22) Filed: Oct. 28, 2024

(65) Prior Publication Data

US 2026/0118147 A1 Apr. 30, 2026

(51) Int. Cl.
*F16K 31/53* (2006.01)
*F16K 1/22* (2006.01)
*F16K 37/00* (2006.01)
*G01F 1/40* (2006.01)
*G01F 1/50* (2006.01)

(52) U.S. Cl.
CPC ............ *F16K 31/535* (2013.01); *F16K 1/221* (2013.01); *F16K 31/53* (2013.01); *F16K 37/0041* (2013.01); *G01F 1/40* (2013.01); *G01F 1/50* (2013.01)

(58) Field of Classification Search
CPC .... F16K 31/041; F16K 31/042; F16K 31/043; F16K 31/045; F16K 31/53; F16K 31/535; F16K 37/0041; F16K 1/221; G01F 1/40; G01F 1/50
USPC .................................................... 251/129.11
See application file for complete search history.

(56) References Cited

U.S. PATENT DOCUMENTS

| | | | | | |
|---|---|---|---|---|---|
| 1,821,622 | A * | 9/1931 | Edwards | F16K 31/32 | |
| | | | | 137/410 | |
| 1,943,854 | A * | 1/1934 | Beckwith | F16K 31/05 | |
| | | | | 251/249.5 | |
| 2,642,077 | A * | 6/1953 | Waterman | F02C 9/38 | |
| | | | | 137/506 | |
| 2,893,683 | A * | 7/1959 | Donald | F16K 1/00 | |
| | | | | 251/145 | |
| 3,011,754 | A * | 12/1961 | Ander | F16K 1/221 | |
| | | | | 192/58.4 | |

(Continued)

FOREIGN PATENT DOCUMENTS

| | | | | |
|---|---|---|---|---|
| EP | 1359355 A1 * | 11/2003 | F16K 31/043 |
| EP | 4596927 A1 * | 8/2025 | F15B 13/0444 |
| GB | 2375584 A * | 11/2002 | F16K 31/563 |

OTHER PUBLICATIONS

Interview agenda Feb. 17, 2026 (attached oa.appendix).*

*Primary Examiner* — William M Mccalister
(74) *Attorney, Agent, or Firm* — John W. Bowman; Darrow Mustafa PC

(57) ABSTRACT

Architectures and techniques are described that can facilitate detection of backlash or other elements of lost motion that can be exhibited in a gear train of an actuator that controls a fluid flow control device such as a damper, valve, or other suitable structure. Further described are techniques to mitigate said lost motion in the context of fluid flow control devices such as by adding a spring assembly that mitigates error or deviation of a fluid flow measurement due to lost motion.

25 Claims, 13 Drawing Sheets

(56) References Cited

U.S. PATENT DOCUMENTS

| | | | | | |
|---|---|---|---|---|---|
| 3,266,379 | A * | 8/1966 | Kreuter | G05B 11/50 | 74/388 R |
| 4,500,478 | A * | 2/1985 | Furukawa | F02M 1/10 | 261/DIG. 74 |
| 4,584,511 | A * | 4/1986 | Rudich, Jr. | H02K 17/30 | 74/460 |
| 4,850,319 | A * | 7/1989 | Imoehl | F02D 11/107 | 261/65 |
| 5,137,257 | A * | 8/1992 | Tice | F16K 31/04 | 74/411 |
| 5,868,114 | A * | 2/1999 | Kamimura | F02D 11/10 | 123/399 |
| 6,173,939 | B1 * | 1/2001 | Dottavio | F16K 1/221 | 251/305 |
| 6,302,089 | B1 * | 10/2001 | Zimmermann | F02M 26/54 | 123/568.24 |
| 6,533,243 | B1 * | 3/2003 | Sumner | F16K 31/602 | 251/303 |
| 7,207,545 | B2 * | 4/2007 | Kawai | F02D 9/1065 | 251/305 |
| 7,581,572 | B1 * | 9/2009 | Sutera | B67D 7/42 | 141/311 A |
| 8,118,276 | B2 * | 2/2012 | Sanders | G05B 19/39 | 137/554 |
| 8,480,054 | B2 * | 7/2013 | Pintauro | F02B 39/00 | 464/134 |
| 8,931,755 | B2 * | 1/2015 | Staffiere | F16K 31/05 | 251/129.11 |
| 10,184,681 | B2 * | 1/2019 | Du | B23P 19/04 | |
| 2005/0151102 | A1 * | 7/2005 | Brinks | F16K 31/047 | 251/129.11 |
| 2005/0263731 | A1 * | 12/2005 | Fauni | F02D 11/107 | 251/129.11 |
| 2006/0144450 | A1 * | 7/2006 | Hasegawa | H01M 8/04089 | 137/625.46 |
| 2009/0114861 | A1 * | 5/2009 | Luebbers | F16K 3/03 | 251/129.11 |
| 2013/0140477 | A1 * | 6/2013 | Shimane | H02K 7/116 | 310/83 |
| 2015/0102244 | A1 * | 4/2015 | Telep | F02M 26/48 | 251/251 |
| 2017/0138274 | A1 * | 5/2017 | Stark | F16K 31/047 | |
| 2022/0275877 | A1 * | 9/2022 | Ambrosino | F16K 1/224 | |

* cited by examiner

208 POSITION INDICATOR BASED ON AXEL 204 ORIENTATION

210 APERTURE DIMENSIONS BASED ON SHAFT 202 ORIENTATION

TECHNIQUES FOR UNIVERSALLY DETECTING OR MITIGATING FLUID FLOW MEASUREMENT ERRORS

CROSS-REFERENCE TO RELATED APPLICATIONS

This application is related to, U.S. application Ser. No. 18/469,120, filed Sep. 18, 2023, entitled "DISCRETE POINT REMOTE CALIBRATION OF A FLUID FLOW DEVICE". The entire contents of this disclosure is hereby incorporated by reference for all purposes, as if fully set forth herein.

BACKGROUND

Accurately measuring and regulating a flow of a fluid (e.g., air, liquid . . . ), is a common goal, but typically expensive, particularly for low fluid flows. Prior to the introduction of a variable orifice plate (VOP) technology, the costs for measuring low fluid flows generally were prohibitive and not commercially viable in the marketplace. Further, existing flow measurement devices that do not rely on VOP technology provide limited turndown ratio, typically about 4:1 (whereas in contrast VOP technology can obtain up to 300:1 turndown ratio), and therefore do not support accurate measuring functionality for fluid flows. These low turn-down devices create millions of unnecessary part numbers which creates a dysfunctional cumbersome business model. For instance, typical heating, ventilation, and air conditioning (HVAC) systems do not perform with accuracy due to the high costs of measuring air flow and limited turndown.

A common work around prior to the introduction of VOP devices detailed herein was to run the system at a flow rate no lower than what can be measured and controlled (e.g., no lower than about 550 feet per minute (FPM)). Doing so, however, causes the HVAC systems to consume needless amounts of energy and also hinders their purpose of providing comfort to people in a building. Previous technology uses large total pressure values, which significantly drains energy. Hence, VOP devices meet a need for a practical way to measure fluid volumes and regulate the resulting fluid flow in an economically viable manner.

Fluid flow devices such as the disclosed VOP devices are typically commissioned in the lab environment using a calibration device of some sort such as a test stand, a wind tunnel, a computational fluid dynamics (CFD) simulation device, or other suitable configuration device. Such can produce surface equations or other useful data that can be used once the fluid flow device is installed in the field in order to measure fluid flows and also control fluid flows by varying the dimensions of the orifice or aperture. For example, VOP devices, which can accurately measure flows as low as a few FPM, can replace conventional variable air volume (VAV) devices that are not able to accurately measure low fluid flows.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
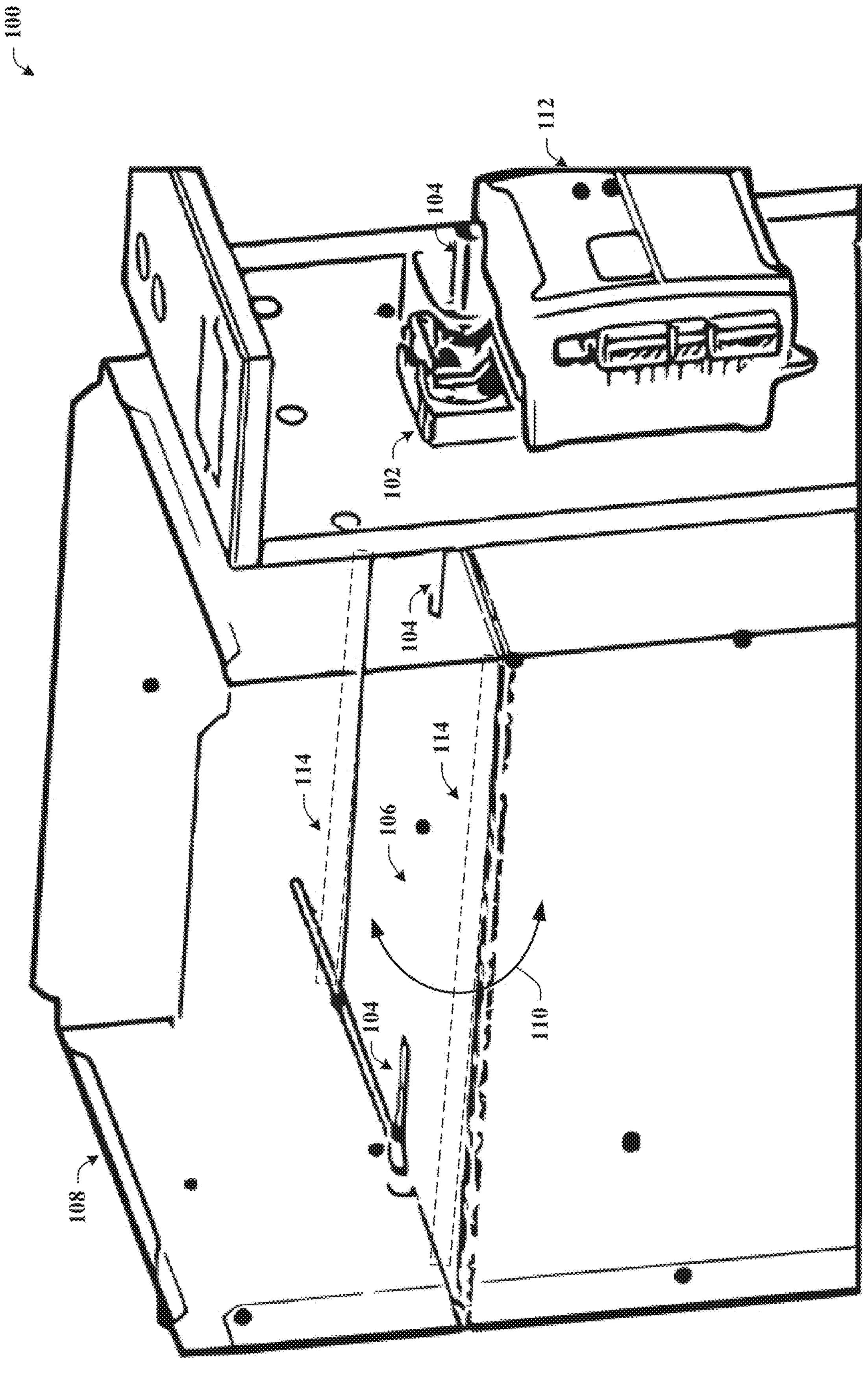
FIG. 1 illustrates an isometric view of an example fluid flow control device 100 in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

The next generation of HVAC flow measurement and flow control technology relies on accurate damper position feedback that is repeatable with calibration curves embedded in a controller/processor. VOP technology is a recent physics discovery that obsoletes fixed orifice plate technology that was previously used to measure fluid flows. VOP technology can provide for measuring flows with an accuracy similar to fixed orifice plate technology while also varying the dimensions of the orifice/aperture (e.g., via updating a state of a damper, valve, or other suitable structure) to control the flow as well. VOP technology relies on accurate position feedback, for instance, feedback relating to a position of a damper or valve configured to change the dimensions (e.g., cross sectional area and/or area of the aperture normal to the flow) of the variable orifice or aperture. In contrast, with regard to the previous fixed orifice plate technology, the inventors have discovered that position feedback heretofore relied upon was not always accurate.

As noted in the Background section, VOP devices can replace conventional variable air volume (VAV) devices that were not able to accurately measure low fluid flows. Even though certain portions of the old (e.g., VAV) technology was being replaced by the new (e.g., VOP) technology, for the sake of economy, some portion of the old technology can be used such as an existing VAV actuator/controller. Even though the inventors have discovered that existing VAV actuators were not always accurately reporting position feedback, the associated error introduced was never discovered.

By way of explanation, an error in a position of a VAV damper reported by the actuator that causes the flow calculations to be off by 5 FPM is largely insignificant when the flow is 500 FPM or above and therefore the error would amount to no more than 1% of the total flow. In contrast, when the total flow is 50 FPM, or a mere 5 FPM, the same reporting error could amount to 10%, or 100% respectively.

In other words, because VAV devices are incapable of measuring low fluid flows, the reporting error associated with VAV actuators discovered by the inventors went unnoticed because the effects of the error were not significant at measureable flows. However, when actuators in the market (e.g., those designed for and used by VAV devices) were deployed with VOP devices, the aforementioned actuator position reporting error became significant, particularly at low fluid flows.

Despite the significant error occurring on occasion, the source of the error remained unidentified. Several teams of engineers and other skilled artisans in the field were unable to identify the source of the error, generally because it was immediately assumed that the equations for the new (e.g., VOP) technology was the source of the errors rather than the tried and tested old (e.g., VAV) technology.

In that regard, it was immediately assumed that the VAV actuators were reporting accurate data because there was never any similar problem observed with deployments using the previous VAV technology. In hindsight, it can be observed that the error did in fact exist with the previous VAV technology, but the previous VAV technology was simply not sensitive enough to identify the error. However, this observation went unnoticed by several teams of engineers and skilled artisans and the identification of the problem itself was not an obvious determination in the field of fluid flow control and measuring devices such as HVAC devices, due at least in part to the difficulties noted above.

As has been noted, VOP technology relies on accurate position feedback and repeatable calibration curves, whereas with fixed orifices position feedback was not critical. Existing actuators/controllers use gears that introduce what is referred to herein as lost motion. Lost motion can include gear backlash, gear teeth play, strength of the transmission mechanism, gear hysteresis, and other sources of error or deviation. Lost motion can refer to the total displacement that occurs in both directions when a load torque corresponding to about 5% of the permissible torque is applied to the gearhead output shaft. In other words, lost motion is the loss of motion in the load shaft while the motor shaft is moving and includes backlash and gear hysteresis loss, and is further detailed in connection with FIG. 3.

Current actuators/controllers use gears that generate backlash or other sources of lost motion, making it difficult to repeat with a calibration equation/procedure. Compounding the issues associated with backlash and lost motion, many VAV actuator/controllers available on the market today from various manufacturers such as Siemens, Schneider, Honeywell, JCI, Distech, Delta, Belimo, et al. all use different types of actuators, feedback, angular position, and software further complicating the issue. When a building automation system (BAS) is installed, typically the BAS supplier supplies all the zone level VAV controllers with the same brand BAS system. What is needed is a universal way to eliminate the backlash when using any of these controllers. Such can be profoundly useful when accurate position feedback is required (e.g., with VOP devices) and can also make previous VAV devices more accurate.

Example Systems

Initially referring to FIG. 1, an isometric view of an example fluid flow control device 100 is depicted in accordance with certain embodiments of this disclosure. Fluid flow control device 100 can relate to any suitable technology for controlling a flow of a fluid. For example, in some embodiments, fluid flow control device 100 can relate to previous technology such as fixed orifice plate technology, variable air volume technology or another suitable technology. In some embodiments, fluid flow control device 100 can relate to VOP technology.

As illustrated, fluid flow control device 100 can comprise an actuator device 102 as well as an integrated or coupled controller device 112. Actuator device 102 can comprise a load shaft 104 that controls the orientation of some physical structure such as a damper, a valve, a concentric tube, a rod, and so on. In this illustrative example, the physical structure is damper 106. Thus, the orientation of damper 106 can control of a flow of a fluid (e.g., a gas, a liquid, particulates, . . . ) through a conduit. In this example, the conduit is duct 108, specifically an HVAC air duct but it is understood that the conduit could be a pipe, tube, channel, or substantially any suitable structure that wholly or partially encloses or constrains a flow of a fluid and can be used in connection with any suitable application directed to measuring or controlling the flow of a fluid.

In the present illustration, damper 106 is in a fully closed state that prevents the fluid (e.g., air) from flowing through duct 108. However, by operation of a motor (see FIG. 2) of actuator 102, load shaft 104 can be rotated in a direction 110 about load shaft 104. As a result, two apertures 114 are created at opposing sides of damper 106 through which the fluid can flow. As can be visualized the size (e.g., dimensions) of apertures 114 can grow as damper 106 rotates toward a fully open state and shrink as damper 106 rotes toward a fully closed state.

VOP technology can accurately measure this flow, including extremely low flows, with inexpensive devices such as transducers or pressure sensors. In that regard, VOP technology can accurately measure a flow based on an area (e.g., dimensions) of one or more apertures such as apertures 114. Certain scientific or technological breakthroughs associated with VOP technology included the discovery that the respective areas of multiple apertures (e.g., with multiple vena contracta) could be combined, and further that the shape of the aperture(s) need not be limited to a circle or annulus shape as was previously believed in connection with fixed orifice plate technology.

As such, in accordance with VOP technology, a simple damper configuration, as detailed here, can be used to both accurately measure and control a flow of a fluid. In the example case, apertures 114 that are created when the damper opens can have a shape that is approximately rectangular, but it is understood that other physical structures (e.g., other than the example damper blade illustrated) can result in a variety of aperture shapes including, e.g., a circle, a triangle, a diamond, trapezoid, ellipse, parallelogram sphere, half sphere, quarter sphere, and so on. Moreover, multiple instances of any of these or other modeled shapes can be used, or instances of multiple different ones of these or other modeled shapes can be used concurrently.

Figure 2:
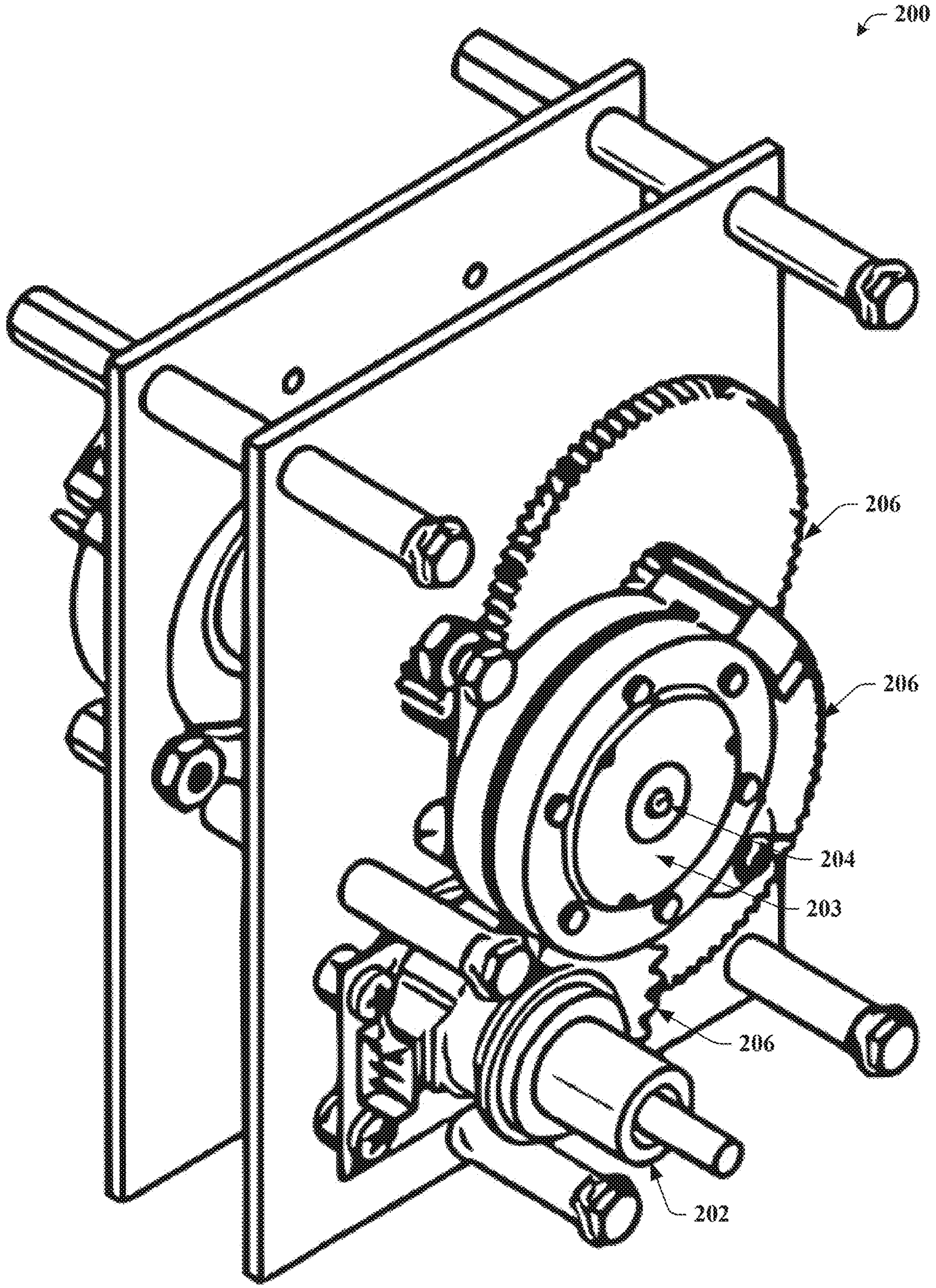
FIG. 2 depicts an isometric view of certain internal components of an actuator device 200 are illustrated in accordance with certain embodiments of this disclosure.

With reference now to FIG. 2, an isometric view of certain internal components of an example actuator device 200 (e.g., actuator device 102) are illustrated in accordance with certain embodiments of this disclosure. For example, actuator device 200 can comprise a load shaft 202 representing a shaft upon which the load is applied. For example, load shaft 202 (e.g., load shaft 104) can be a shaft that controls the orientation a damper or other physical structure that controls a flow of a fluid such as damper 106.

Actuator device 200 can further comprise one or more motors 203 and one or more associated motor axels 204 representing an axis about which a motor gear turns. Actuator device 200 can further comprise various gears 206, which can be collectively referred to as a gear train or gearbox. As is known, gears 206 can be used to provide mechanical advantage, to change a rotational range, to change a speed, to provide increased precision, and so on.

As illustrated at reference numeral 208, in conventional actuator designs such as those on the market today, a position indicator device or mechanism is generally based on an orientation or position of motor axel 204. However, as indicated at reference numeral 210, and as can be seen by returning to FIG. 1, the dimensions of apertures 114 through which the fluid flows can be based on the orientation of the load shaft 202, 104. Unfortunately, in some cases there can be an error or deviation between motor axel 204 and load shaft 202, one example of which can be due to backlash, which is further detailed in connection with FIG. 3.

Figure 3:
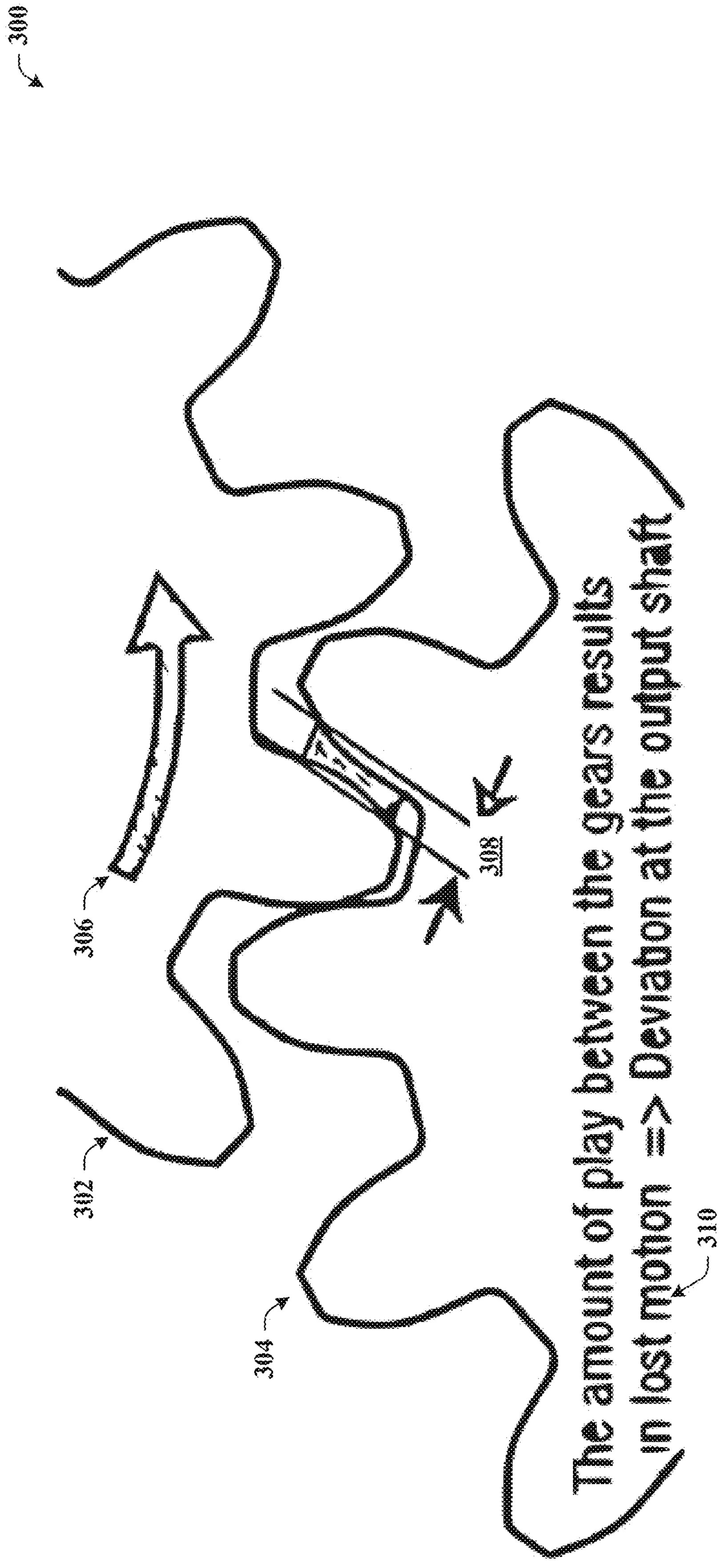
FIG. 3 illustrates an example diagram 300 depicting two conventional gears to illustrate backlash, which can represent a component of lost motion in accordance with certain embodiments of this disclosure.

Turning now to FIG. 3, example diagram 300 depicts two conventional gears to illustrate backlash, which can represent a component of lost motion in accordance with certain embodiments of this disclosure. For illustrative purposes, suppose gear 302 is associated with a motor axel (e.g., motor axel 204) and gear 304 is associated with load shaft 202, which drives a flow control structure such as damper 106. As can be observed, gear 302 last rotated in a clockwise direction (e.g., opposite of direction 306. Such caused the teeth of gears 302, 304 to be in contact on the left side, and a certain amount of play or clearance on the other side.

This play or clearance can be referred to as backlash 308. Backlash 308 can represent the play, or clearance, between meshing gears inside a gearbox of a motor. Torsional backlash can be measured when about 2% of the load torque is applied to the gear shaft. In most gearboxes, backlash 308 is necessary for several reasons. First, gear manufacturing is not 100% perfect. Manufacturing tolerances, bearing dimensions, thermal considerations, and other practical considerations contribute to the size of backlash 308. Other reasons are to leave space for lubricants, reduce friction in the gears, and/or allow for metal expansion. Regardless without a certain amount of play or clearance, gears 302, 304 would likely bind up and not work as intended.

A gearhead, or gearbox, can be used to both increase the torque (and inertial load) of a motor and reduce the speed. The gearbox can contain a casing, gears, shafts, and bearings. As described above with regard to backlash 308, when the gears mesh together, there is actually a tiny gap between the gears on the other side. Such can introduce inaccuracy in applications where precision is important because the load shaft can potentially move by the distance of the gap. For example, when the application calls for gear 302 to rotate counterclockwise (e.g., direction 306), then gear 302 can move a distance up to the amount of the gap (e.g., backlash 308) without translating any motion to gear 304. Such can represent lost motion for the load shaft and/or the output shaft. It is further noted that when multiple gears exist between the motor and the load shaft, respective gaps (e.g., backlash 308) can accumulate to further increase the deviation or error.

It is noted that while the existence of backlash 308 may be known in other fields to potentially be a source of certain inaccuracies, in the field of fluid flow control devices, such has heretofore never been identified. Further, due to the inherent inaccuracies of previous flow control devices (e.g., VAV devices), errors due to backlash 108 were disguised or even potentially presumed not to exist and/or never considered since no associated errors were recognized with previous technology. With a history of (perceived) proper functioning due to the fact that such errors become prominent only at low fluid flows which was precisely the ranges previous technology failed to measure with accuracy, issues associated with backlash 308 were not discovered or contemplated. As a result, upon introduction of VOP technology, skilled artisans in the field were not motivated to consider backlash 308 as being a source of inaccuracies, particularly when those skilled artisans assumed there was no such error, since no similar errors had been identified when using the same actuator/controller devices (e.g., actuator 102, controller 112) in connection with previous technology.

Several months and hundreds if not thousands of man-hours by experts in the field were committed to discovering the source of the problem without success, illustrating that identification of the problem itself (e.g., backlash 308, lost motion 310, among others) was not an obvious determination. Indeed, as noted above, in the associated domain, it was widely held that the error must be due to some issue associated with the newly introduced VOP technology. Moreover, various solution with respect to error or deviations caused by backlash 308 or other elements of lost motion 310 may be different than solutions in other fields due to the universal nature of certain solutions detailed herein that can be applied and potentially configured for many existing flow control devices spanning many different actuator manufacturers or brand names.

Further still, it can be observed that backlash 308 will lead to lost motion 310 typically only in the case of bi-directional applications in which the motor axel 204 rotates in both directions (e.g., clockwise and counterclockwise) in order to control an orientation of the load shaft 202. In applications in which motor axel 204 only rotates in one direction to control load shaft 202, backlash 308 will not generally lead to lost motion 310. Hence, lost motion 310 may not be exhibited at all until motor axel 204 changes a direction of rotation 306, potentially further disguising the issue and making identification of the issue more perplexing.

As has been discussed, when calibrating a VOP damper/aperture device, the position feedback is expected to be accurate and repeatable when the damper shaft rotates in a clockwise or counterclockwise motion. As introduced above, one issue with existing actuators on the market today is that these actuator devices include an error, but one which was never contemplated or discovered. For example, the load shaft 202 of existing devices will rotate (e.g., clockwise) as the gear teeth are engaged. However, when the damper shaft needs to turn the opposite direction, there is a delay for the gears to engage due to backlash or other lost motion elements. Such can throw off the calibration curve substantially for VOP devices even though such was never discovered in connection with VAV devices or the like. Dampers change positions often based on the varying pressure and varying velocity required at the damper. This continuous occurrence of lost motion can make it difficult for repeatability and for a calibration curve.

In mechanical engineering, backlash 308, sometimes called lash, play, or slop, is a clearance or lost motion in a mechanism caused by gaps between the parts. It can be defined as "the maximum distance or angle through which any part of a mechanical system may be moved in one direction without applying appreciable force or motion to the next part in mechanical sequence. As described above in FIG. 3, backlash 308 is an example, in the context of gears and gear trains, of the amount of clearance between mated gear teeth. It can be seen when the direction of movement is reversed, and the slack or lost motion is taken up before the reversal of motion is complete. This slack can throw off the calibration curve by 5-30% or even more in some cases.

The disclosed subject matter is generally directed to detecting and mitigating or eliminating errors that can arise due to lost motion 310 and/or backlash 308. One technique for mitigating lost motion 310 is to add a universal spring assembly to existing actuator/controllers, which is further detailed in connection with FIGS. 4-6A. The universal spring assembly can be configured for many different types or brands of actuator device and can be coupled to the load shaft 202 to apply a persistent torque force to the load shaft 202 that operates to prevent errors due to lost motion 310.

Another technique for mitigating lost motion 310 is detailed in connection with FIG. 6B. Such can relate to a redesign, retrofit, or addition to existing controllers to relocate, add, or change the position sensor device that provides feedback data (e.g., data indicative of an orientation of the load shaft 104, 202). In that regard, instead of obtaining feedback data from a position sensor associated with the motor 203 (e.g., motor axel 204), feedback data can instead be received from a position sensor associated with load shaft 104, 202. Thus, the orientation of load shaft 104, 202 can be measured directly rather than as a function of motor axel 204 that is potential subject to the lost motion 310 by being propagated through the gear train (e.g., gears 206). Hence, issues associated with backlash 308 and lost motion 310 can be avoided entirely in this embodiment.

Still another technique for mitigating lost motion 310 is detailed in connection with FIG. 6C. Such can relate to a redesign, retrofit, or addition to existing controllers to relocate, add, or change the position sensor device that provides feedback data (e.g., data indicative of an orientation of the load shaft 104, 202). In that regard, instead of obtaining feedback data from a position sensor associated with the motor 203 (e.g., motor axel 204), feedback data can instead be received from a position sensor associated with the physical structure of the flow control device such as damper 106. As with the second technique indicated above, issues associated with backlash 308 and lost motion 310 can be avoided entirely in this embodiment. In some embodiments, the position sensor can thus be external to the actuator assembly, with a relevant change being that the feedback data is received from the external position sensor replaces or overrides feedback from the internal sensor that typically only indirectly measures the orientation and is therefore subject to lost motion 310 and/or backlash 308.

As detailed in connection with FIGS. 8-10, in addition to mitigating lost motion 310, the disclosed techniques can further be used to detect the presence of lost motion 310, which may lead to errors or deviation, and measure an amount of lost motion 310. In view of this information, the disclosed devices can indicate a recommended solution, e.g., from among the mitigation techniques detailed herein. In some embodiments, an updated can be recommended, e.g., when lost motion 310 is detected a recommendation can be issued to change a torque force associated with the spring assembly or the like.

Further still, when lost motion 310 is detected and the amount of lost motion 310, then, in some embodiments, such can be accounted for numerically rather than mechanically. In other words, instead of mitigating lost motion 310 via mechanical techniques (e.g., adding a spring assembly mitigate lost motion 310 or changing the object of measurement to avoid lost motion 310), lost motion 310 can be accounted for numerically, but, e.g., accounting for the amount of lost motion 310 upon certain direction changes of motor axel 204.

Figure 4:
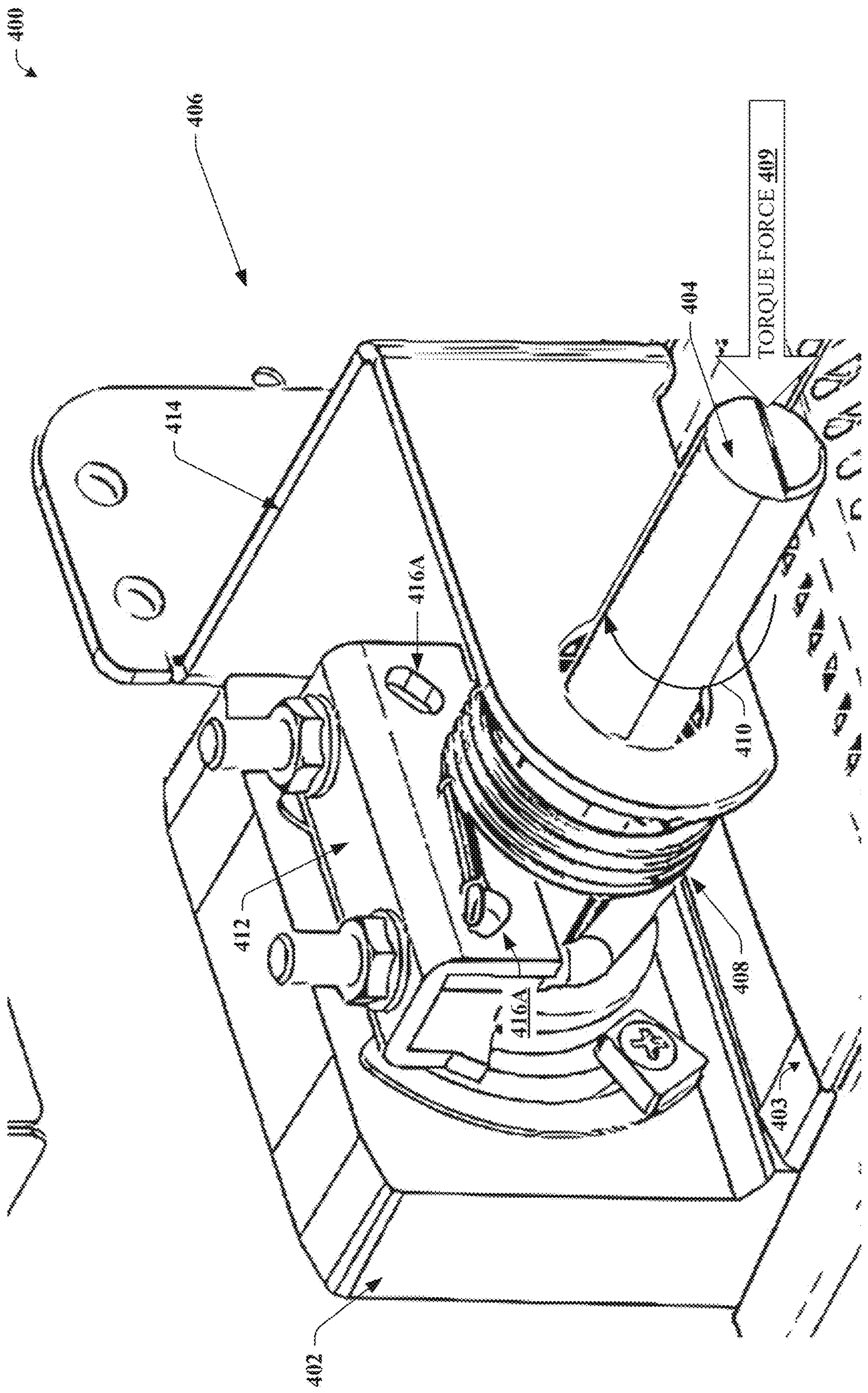
FIG. 4 depicts an isometric diagram 400 illustrating a first view of an example spring assembly configured to be coupled to a load shaft of an actuator device for a fluid flow control device in accordance with certain embodiments of this disclosure.

With reference now to FIG. 4, an isometric diagram 400 is depicted illustrating an example spring assembly configured to be coupled to a load shaft of an actuator assembly for a fluid flow control device in accordance with certain embodiments of this disclosure. As illustrated, an actuator assembly can comprise an actuator 402 (e.g., actuator device 102) as well as a controller 403 (e.g., controller device 112) that can individually or collectively control an orientation of load shaft 404 (e.g., load shaft 104, 202), for instance by rotating load shaft 404 in a direction 410 (e.g., direction 110) about an axis of load shaft 404. The orientation of load shaft 404 can determine or indicate dimensions of at least one aperture (e.g., apertures 114) of a fluid control device or structure (e.g., damper 106) that controls a flow of a fluid through a conduit (e.g., duct 108). In some embodiments, the fluid control device can control the flow of the fluid based on feedback data received from a control device 403 or another device of the actuator assembly.

Diagram 400 also illustrates a spring assembly 406. Spring assembly 406 can be coupled to the actuator assembly or actuator 402 and/or directly coupled to load shaft 404 as depicted here. Spring assembly 406 can comprise a spring 408 configured to apply torque force 409 to load shaft 404 in a direction 410 about load shaft 410. As illustrated in the example case, spring 408 can be a torsion spring. In other embodiments, spring 408 can be a compression spring, an extension spring, a conical spring, a spiral spring, a Belleville spring, a leaf spring, a belt spring, a helical spring, a disc spring, a grater spring, or another suitable spring. In some embodiments, spring 408 can be replaced by another suitable device such as a belt, a pulley, or another device that can apply a torque force 409 or equivalent to load shaft 404 in a direction 410. In some embodiments, spring 408 or an equivalent can be configured to provide torque force 409 that varies between a fully open state and a fully closed state of an associated fluid control device (e.g., damper 106). In other embodiments, spring 408 or an equivalent can be configured to provide torque force 409 that is substantially constant between a fully open state and a fully closed state of an associated fluid control device.

Direction 410 can be either clockwise or counterclockwise depending on the implementation. Thus, rotation of load shaft 404 in the first direction can operate to increase the dimensions of the at least one aperture up to and including a fully open state of the fluid control device. According to a different implementation, rotation of load shaft 404 in the first direction can operate to decrease the dimensions of the at least one aperture up to and including a fully closed state of the fluid control device. In other words, torque force 409 can persistently remove the play or backlash 308 that leads to lost motion 310 within the gear train of actuator 402 that might otherwise lead to errors or deviation. Despite the potential for backlash 308, spring 408 can operate to ensure that a given orientation of the motor axel will persistently match an associated orientation of load shaft 404.

Accordingly, in some embodiments, torque force 409 can be configured to have a magnitude that is determined to be sufficient to reduce lost motion associated with gears of actuator 402 and/or the actuator assembly. In other words, the minimum magnitude of torque force 409 can be some threshold that is determined to be sufficient to rotate load shaft 404 in direction 410 to mitigate the potential for lost motion. As can be understood, the minimum threshold can be a function of the structure, arrangement, and operation of the particular type of actuator 402 and load shaft 404 as well as the characteristics of the fluid control device such as the mass or weight of damper 106, a pressure within duct 108, and so on. Further, it can be recognized that when spring 408 and/or torque force 409 operates in direction 410 configured to keep damper 106 closed may rely on a different amount of torque than configurations in which the direction 410 is configured to open damper 106.

Furthermore, in some embodiments, torque force 409 can be configured to have a magnitude that less than a threshold torque that is determined to cause excess wear to the actuator assembly when changing the orientation of the load shaft in a manner that opposes the torque force. In other words, the maximum magnitude of torque force 409 can be some threshold that is determined to reduce excess wear on actuator 402, which can be dependent on various characteristics (e.g., type, brand, . . . ) of actuator 402.

Regardless, in various testing procedures, it was determined that a torque force 409 in a range from between about 0.1 in-lbs to about 40 in-lbs had appreciable effect to mitigate errors or deviation due to lost motion 310. A range of between about 0.5 in-lbs and about 30 in-lbs showed potentially improved effects.

Continuing the discussion of diagram 400, spring assembly 406 can further comprise clamp device 412 and bracket 414. Clamp device 412 can be fastened or coupled to load shaft 404. Bracket 414 can be fastened or coupled to actuator 402 or an associated housing or, as illustrated here to another suitable housing such as that for the fluid control device or duct 108. One or both clamp device 412 and bracket 414 can comprise one or more holes or orifices that can be configured to secure opposing ends of spring 408, which is better illustrated with reference to FIG. 5.

Figure 5:
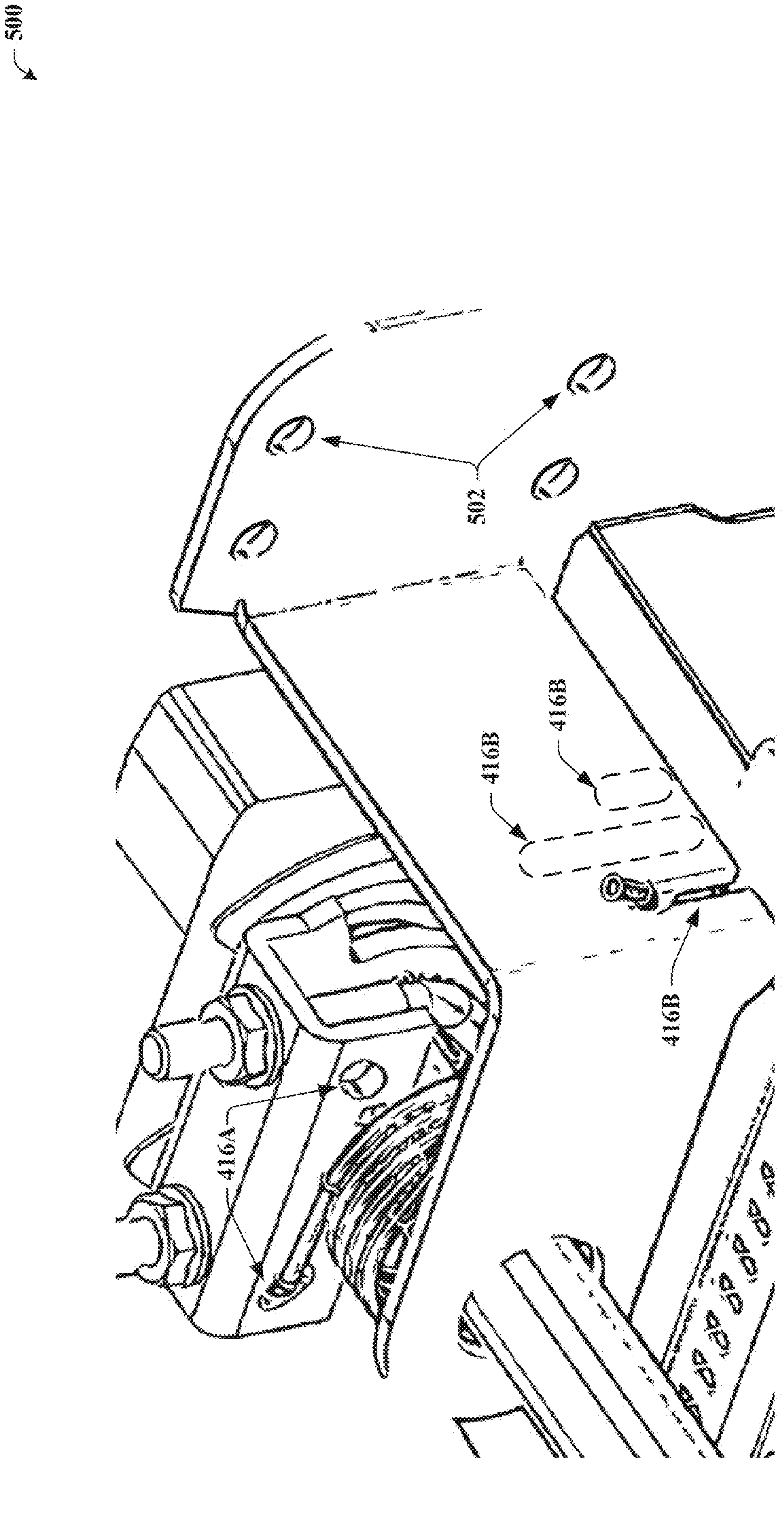
FIG. 5 depicts an isometric diagram 500 illustrating a second view of an example spring assembly configured to be coupled to a load shaft of an actuator device for a fluid flow control device in accordance with certain embodiments of this disclosure.

Turning now to FIG. 5, depicted is an isometric diagram 500 illustrating a second view of the example spring assembly showing various configurable options for the spring in accordance with certain embodiments of this disclosure. As shown, clamp device 412 can comprise one or more first orifices 416A that can be configured to secure a first end of spring 408. While only two such first orifices 416A are illustrated, it is appreciated that many more first orifices 416A can exist and each one can be configured receive and secure the first end of spring 408. Hence, by selecting one of first orifices 416A over a different one can operate to vary torque force 409 that spring 408 applies to load shaft 404. Such can be useful to allow spring 408 to be configured to apply more or less torque force 409 relative to a previous setting. Hence, multiple first orifices 416A can be provided that are specifically configured to match to various different types or brands of actuator 402.

Likewise, bracket 414 can comprise one or more second orifices 416B configured to secure a second end of spring 408. As illustrated, these second orifices 416B can be arranged as slots, as shown having different heights or lengths. As such, selection of one second orifice 416B over another can also operate to vary torque force 409 in a manner similar to first orifices 416A detailed above. Hence, additional configuration options can be available.

Furthermore, bracket 414 can comprise retaining orifices 502 that can be configured to attach (e.g., via screws or other fasteners) bracket 414 to an associated housing. It is noted that by varying the location of attaching, such can also operate to vary torque force 409.

Figure 6A:
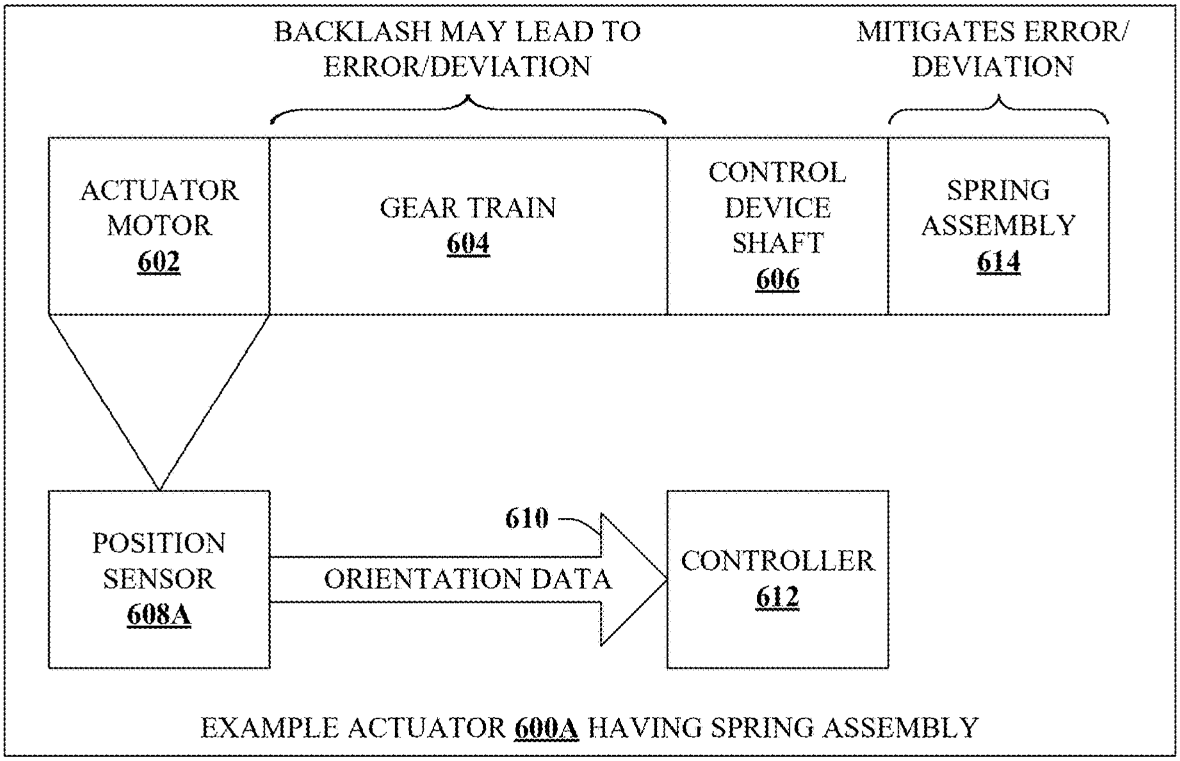
FIG. 6A depicts a schematic block diagram illustrating a first example actuator 600A having a universal spring assembly configured to mitigate lost motion for substantially any type of actuator in accordance with certain embodiments of this disclosure.

Referring now to FIG. 6A, depicted is a schematic block diagram illustrating a first example actuator 600A having a universal spring assembly configured to mitigate lost motion for substantially any type of actuator in accordance with certain embodiments of this disclosure. For instance, actuator 600A can be one example schematic representation of isometric diagrams 400 and 500. Hence, as with existing many actuators on the market today, the internal position sensor 608A, 608B of actuator 600A monitors the actuator motor 602 (e.g., a motor axel or gear or the like). Actuator motor 602 drives a gear train 604 (e.g., gears 206) that in turn drive control device shaft 606 (e.g., load shaft 104, 202).

Figure 11:
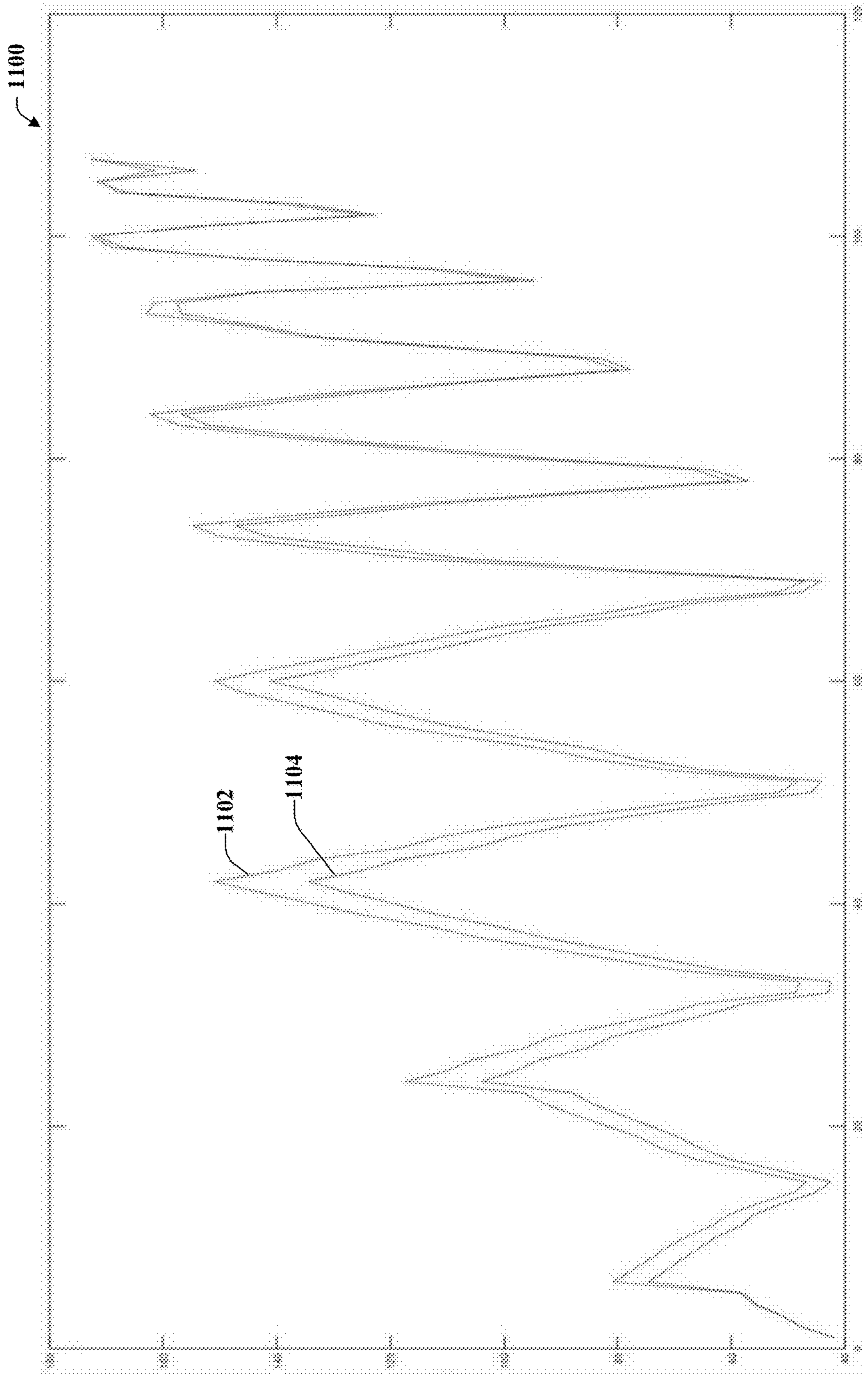
FIGS. 11 and 12 relate to testing procedures that demonstrate the efficacy of an example spring assembly in accordance with certain embodiments of this disclosure.
Figure 12:
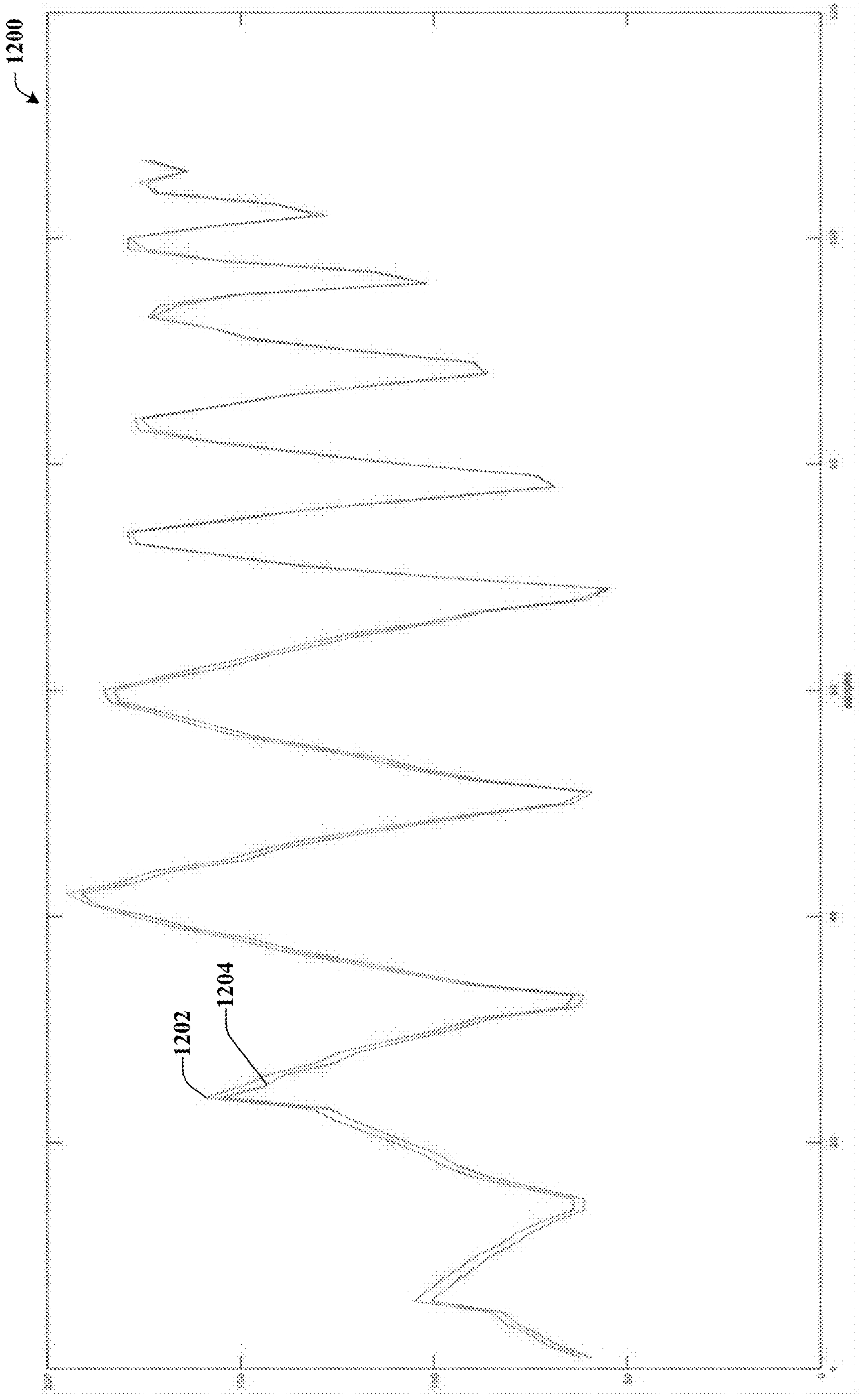

As such, because gear train 604 can lead to errors or deviation due to lost motion or the like, spring assembly 614 (e.g., spring assembly 406) can be coupled to control device shaft 606 to mitigate the lost motion as detailed above. Hence, orientation data 610 representing position feedback data for determining flow control information can be provided to controller 612. Due to the operation of spring assembly 614, backlash or lost motion can be mitigated, allowing orientation data 610 to be more accurate. FIGS. 11 and 12 demonstrate accuracy improvements obtained by using spring assembly 614 to mitigate backlash.

Figure 6B:
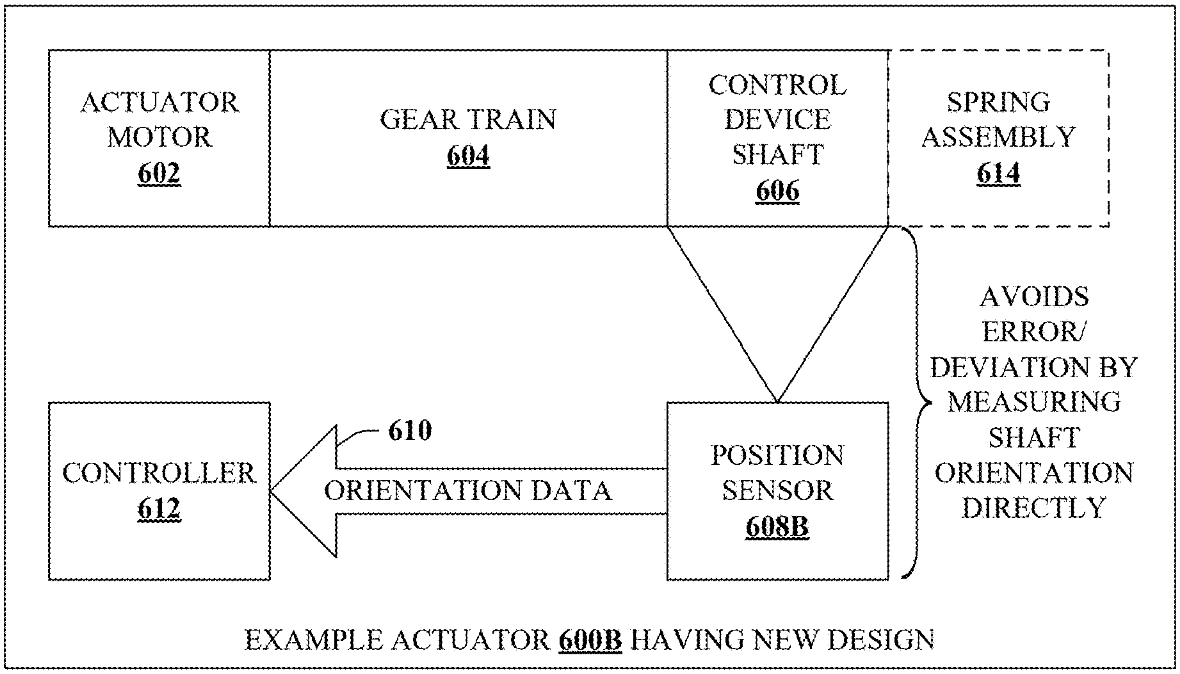
FIG. 6B depicts a schematic block diagram illustrating a second example actuator 600B having a different design that is configured to avoid lost motion in accordance with certain embodiments of this disclosure.

Referring now to FIG. 6B, depicted is a schematic block diagram illustrating a second example actuator 600B having a different design that is configured to avoid lost motion in accordance with certain embodiments of this disclosure. For instance, while many existing actuators are designed such that position feedback is obtained based on measurements associated with actuator motor 602 such as actuator 600A of FIG. 6A, actuator 600B illustrates a different technique to handle backlash or lost motion. In that regard, orientation data 610 can be determined by position sensor 608B in response to directly examining control device shaft 606, as illustrated.

While backlash or other elements of lost motion may still exist in gear train 604, the actual orientation of control device shaft 606 is recorded rather than such being derived from an orientation associated with some element of actuator motor 602. Hence, orientation data 610 relating to the position or orientation of control device shaft 606 can be precisely and accurately reported irrespective of the potential for lost motion occurring in gear train 604.

It is appreciated that position sensor 600B can represent an addition sensor for actuator 600B (e.g., in addition to position sensor 608A) or may operate to directly measure control device shaft 606 by relocating or replacing position sensor 600A. Regardless of the embodiment, of note is that position sensor 608B is the sensor that is used to construct orientation data 610 to provide position feedback to controller 612. In embodiments, in which the actuator has multiple position sensors (e.g., position sensor 608A that monitors actuator motor 602 and position sensor 608B that monitors control device shaft 606 directly) information from position sensor 608A can still be used for other purpose such as for detecting lost motion, which is further detailed in connection with FIG. 8.

While position sensor 608B is intended to avoid the effects of lost motion or backlash, it is noted that in some embodiments, spring assembly 614 may still be coupled to control device shaft 606 to mitigate backlash and/or lost motion. For instance, while position sensor 608B can operate to avoid the effects of lost motion in terms of feedback information by measuring the shaft directly, spring assembly 614 can still serve a role in actuator 600B relating to control functions.

Figure 6C:
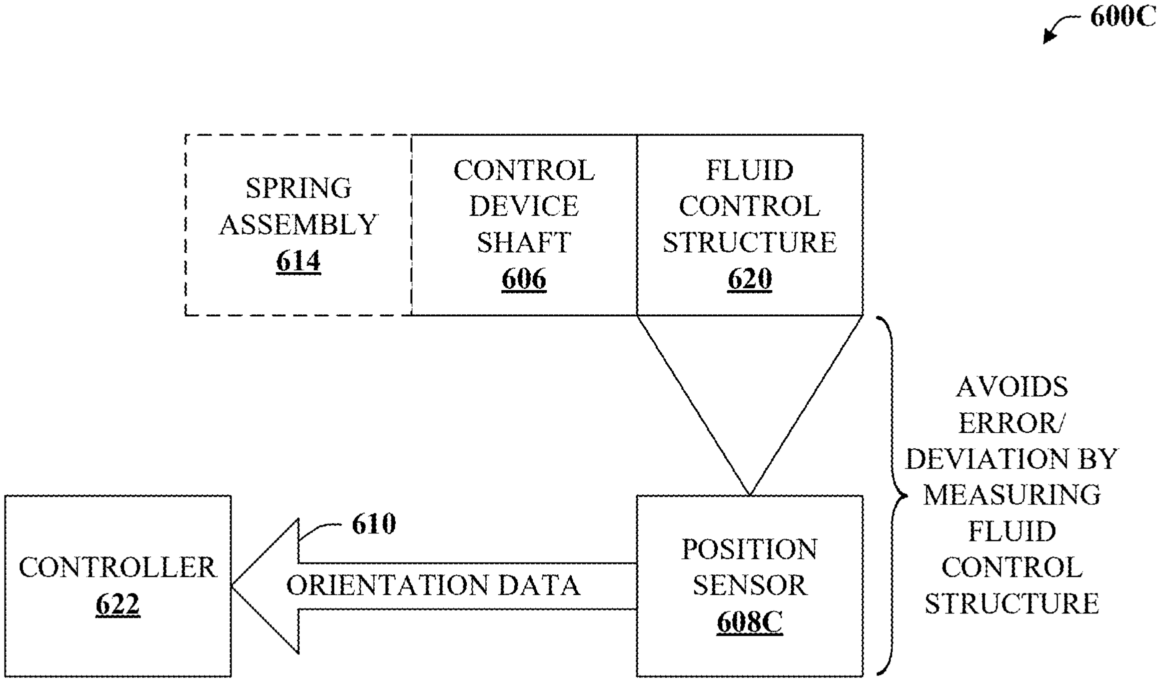
FIG. 6C depicts a schematic block diagram 600C illustrating a third technique to avoid lost motion by measuring a fluid control structure directly in accordance with certain embodiments of this disclosure.

With reference now to FIG. 6C, depicted is a schematic block diagram 600C illustrating a third technique to avoid lost motion by measuring a fluid control structure directly in accordance with certain embodiments of this disclosure. It is noted that position sensor 608A and 608B have been described as being internal to or otherwise associated with an actuator device 600A, 600B. In some embodiments, position sensor 608B (which can measure an orientation of control device shaft) can be external as well, but communicatively coupled to controller 612 that is associated with the actuator.

In the present embodiments, position sensor 608C can be configured to directly measure a position or orientation of fluid control structure 620 (e.g., damper 106). Hence, in some embodiments, position sensor 608C need not be directly associated with the actuator. Thus, orientation data 610 can be provided to controller 622, which can be the same or similar as controller 612 or can be a different control such as a controller for a BAS system at large.

With this arrangement, position sensor 608C can directly measure an orientation of fluid flow device 620 (e.g., a damper blade or valve structure) so that errors or deviation due to lost motion occurring in a gear train can be avoided. Regardless, as was the case with position sensor 608B that avoided the lost motion by measuring control device shaft 606 directly, in some embodiments, spring assembly 614 can still be applied.

Figure 7:
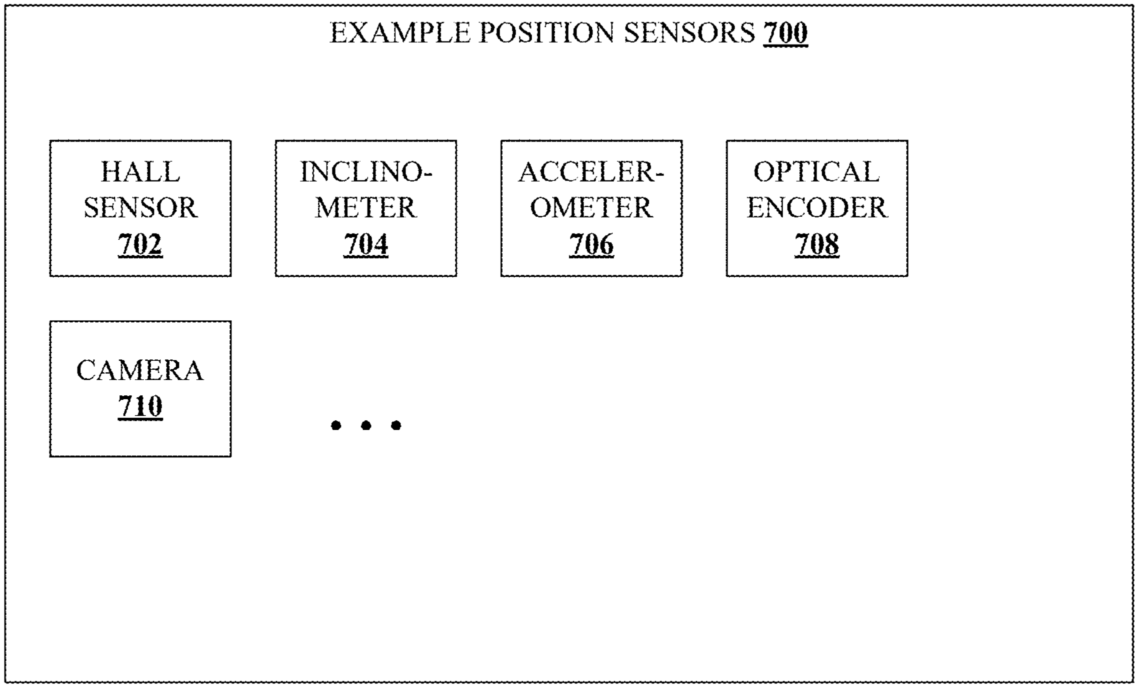
FIG. 7 depicts a schematic block diagram illustrating examples of position sensors 700 in accordance with certain embodiments of this disclosure.

Turning now to FIG. 7, depicted is a schematic block diagram illustrating examples of position sensors 700 in accordance with certain embodiments of this disclosure. Position sensor 700 can include or be representative of all or a portion of position sensors 608A, 608B, or 608C. By way of example, position sensor 700 can be Hall sensor 702, sometimes referred to as a Hall Effect sensor. Hall sensor 702 can be an electronic device that detects the presence and magnitude of a magnetic field using the Hall effect. Hall sensor 702 can convert the magnetic field information into an electronic signal, which can be used to switch a circuit on or off, provide a measurement of a varying magnetic field, or be processed by an embedded computer or displayed on an interface.

In other embodiments, position sensor 700 can also be inclinometer 704, also known as tilt indicator or tilt sensor. Inclinometer 704 can be an instrument used to measure angles of slope, elevation, or depression of an object with respect to gravity's direction. Hence, inclinometer 704 can be a device that detects and quantifies the inclination or tilt of an object, providing a precise measurement of its angle relative to the horizontal plane.

In some embodiments, position sensor 700 can also be accelerometer 706. Accelerometer 706 can relate to an electromechanical device that measures the proper acceleration of an object. Proper acceleration can be the acceleration (e.g., a rate of change of velocity) of an object relative to an observer who is in free fall (e.g., relative to an inertial frame of reference).

In some embodiments, position sensor 700 can be optical encoder 708 or camera 710. Optical encoder 708 can be an electromechanical device that converts rotary or linear motion into an electrical signal. Optical encoder 708 can use a light source, photosensitive detectors, and/or an optical grating to measure the position, velocity, and direction of movement of an object. Optical encoder 708 can operate by detecting the passage of light through a pattern of slits or gratings on a rotating or moving scale, generating a sequence of pulses that are proportional to the movement. Such can include an inferential optical encoder, a reflective optical encoder, a transmissive optical encoder, and so on.

Camera 710 can be any suitable device that captures light (e.g., electromagnetic radiation) and processes the light into an image. Camera 710 or another suitable device can utilize the image to ascertain a position of an object.

Figure 8:
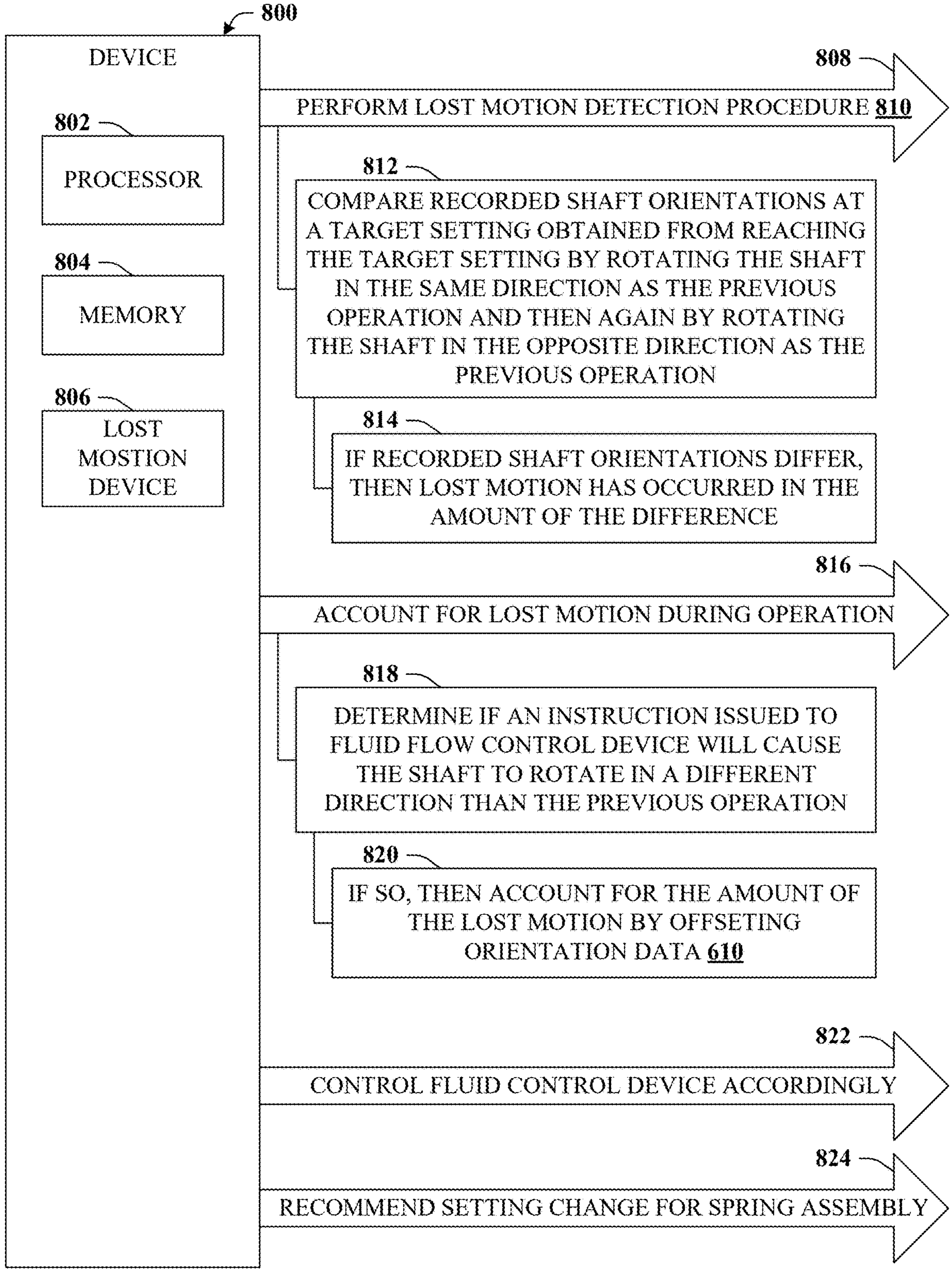
FIG. 8 depicts a schematic block diagram illustrating examples of position sensors 700 in accordance with certain embodiments of this disclosure.

Referring to FIG. 8, depicted is a schematic block diagram illustrating an example device 800 that can detect and/or facilitate mitigation of lost motion for a fluid flow control device in accordance with certain embodiments of this disclosure.

Device 800 can comprise at least one processor 802 that, potentially along with lost motion device 806, can be specifically configured to perform functions associated with mitigating lost motion for a fluid flow control device. Device 800 can also comprise at least one memory 804 that stores executable instructions that, when executed by the at least one processor 802, can facilitate performance of operations. Processor(s) 802 can be a hardware processor having structural elements known to exist in connection with processing units or circuits, with various operations of processor 802 being represented by functional elements shown in the drawings herein that can require special-purpose instructions, for example, stored in memory 804 and/or lost motion device 806. Along with these special-purpose instructions, processor 802 and/or lost motion device 806 can be a special-purpose device. Further examples of the memory 804 and processor 802 can be found with reference to FIG. 13. It is to be appreciated that device 800 or computer 1302 can represent a server device or a client device of a communications platform and computer 1302 can be used in connection with implementing one or more of the systems, devices, or components shown and described in connection with FIG. 8 and other figures disclosed herein.

At reference numeral 808, device 800 can perform lost motion detection procedure 810. Lost motion detection procedure 810 can be executed to identify and/or measure lost motion exhibited by a gear train of an actuator that controls a fluid flow control device. Hence, in some embodiments, lost motion detection procedure 810 can be performed with respect to a configuration similar to actuator 600A in which position sensor 608A is configured to measure an element of actuator motor, and use that measurement to derive an orientation of the control device shaft 606 (e.g., load shaft 104, 202). Lost motion detection procedure 810 can be performed in connection with actuators having or not having spring assembly 614. For example, if spring assembly 614 is not present, the presence of lost motion can be used to recommend adding spring assembly 614. If spring assembly 614 is present and lost motion is still detected, such can indicate, e.g., that spring assembly 614 should be adjusted or reconfigured.

In accordance with lost motion detection procedure 810, at reference numeral 812, device 800 can record a first shaft (or fluid control structure such as a damper) orientation at a target setting associated with the fluid control structure 620 (e.g., damper 106) such as a setting indicative of 20% open. This target setting can be identified to have been reached in response to a control operation that rotates the shaft in a first direction (e.g., direction 110, 410), say, counterclockwise. Hence, the initial state can be a fully closed state that reaches the target setting by opening (e.g., by rotating in the counterclockwise direction) to the target setting.

Subsequently, device 800 can record a second shaft orientation when the target setting is again reached, but in this case from the opposite direction (e.g., clockwise). In that regard, device 800 can further open fluid control structure 620 from the target setting of 20% open to, say, a setting of 40% open, then return it to the target setting of 20% open but with this approach now being from the opposite direction (e.g., clockwise) as the original approach from the fully closed state. Thereafter, the first shaft orientation can be compared to the second shaft orientation. If the two are the same, then it can be determined that no lost motion exists.

On the other hand, as indicated at reference numeral 814, if device 800 determines that the first shaft orientation differs from the second shaft orientation, then it can be further determined that lost motion has occurred in the amount of the difference. As a result, not only is lost motion determined to exist, but the amount of lost motion can be identified as well.

At reference numeral 816, device 800 can account for lost motion should such be determined to exist in response to lost motion detection procedure 810. In that regard, such stands for still another technique to correct for lost motion, which can be accomplished numerically or electronically rather than by mechanical (e.g., spring assembly 614) techniques or techniques that by-pass the lost motion by measuring the load shaft or fluid control structure directly.

For instance, at reference numeral 818, device 800 can determine if an instruction issued to a fluid flow control device will cause the shaft to rotate in a different direction than a previous operation. If not, then lost motion should not occur. Otherwise, if so, then at reference numeral 820, device 800 can account for the amount of lost motion previously identified during lost motion detection procedure 810. For example, the amount of lost motion can be added to or subtracted from, or otherwise offsetting, a reported measurement associated with orientation data 610. Thereafter, as indicated at reference numeral 822, device 800 can control fluid control device accordingly.

Furthermore, in some embodiments, the results of lost motion detection procedure 810 can be used to indicate various suggestions or recommendations. For example, such can be used to recommend one or more of the techniques detailed herein to mitigate or avoid lost motion, which is further detailed in connection with FIG. 9. Additionally or alternatively, as shown at reference numeral 824, in case where spring assembly 614 is already in use, the results of lost motion detection procedure 810 can be utilized to recommend a setting change for spring assembly 614. Thus, lost motion detection procedure 810 can be used to verify that spring assembly was properly configured and/or installed, or might even be used in cases where spring assembly 614 is damaged due to wear or another source.

Example Methods

Figure 9:
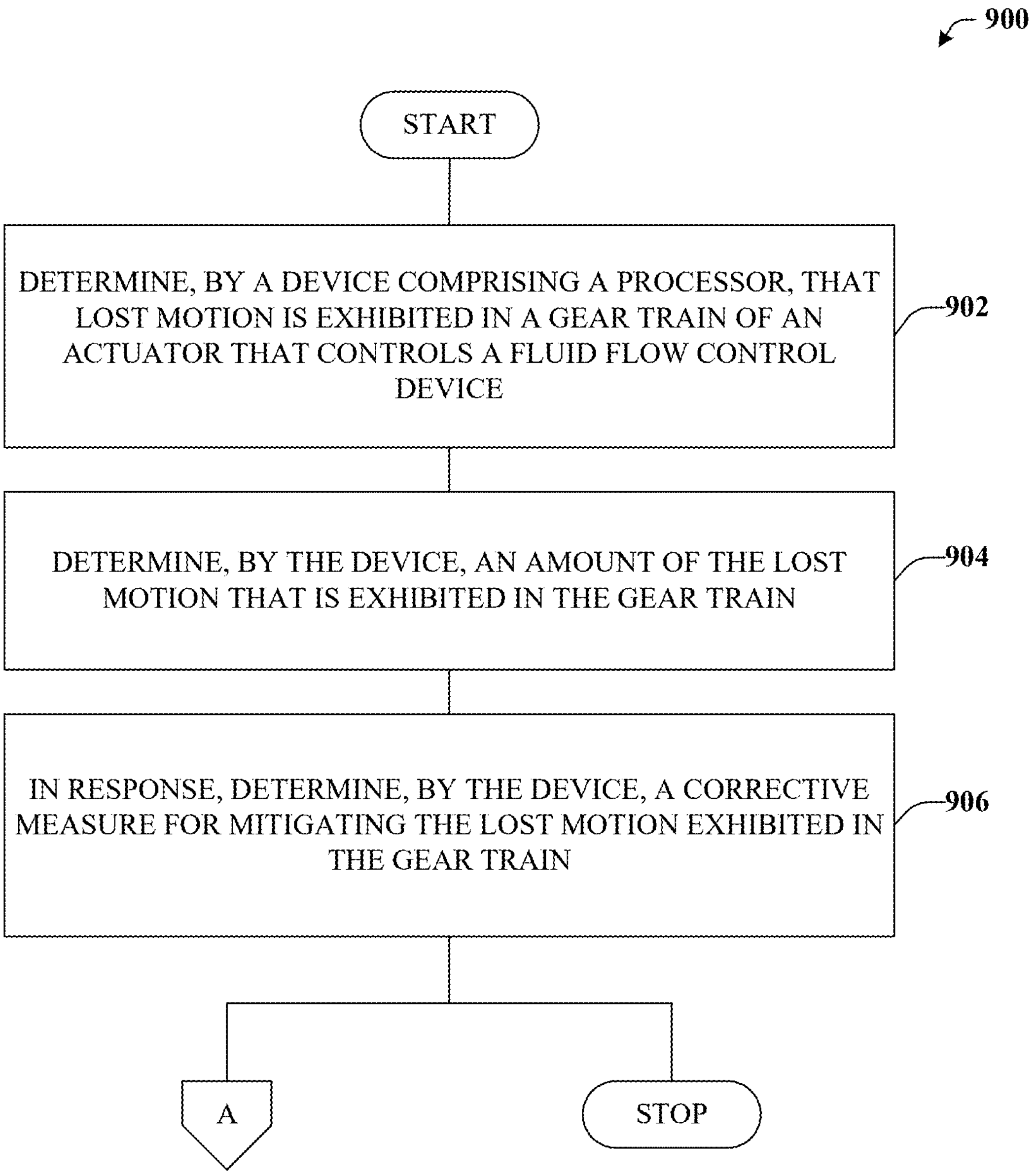
FIG. 9 illustrates an example method that can facilitate the existence of lost motion and an amount of lost motion for a fluid flow control device in accordance with certain embodiments of this disclosure.
Figure 10:
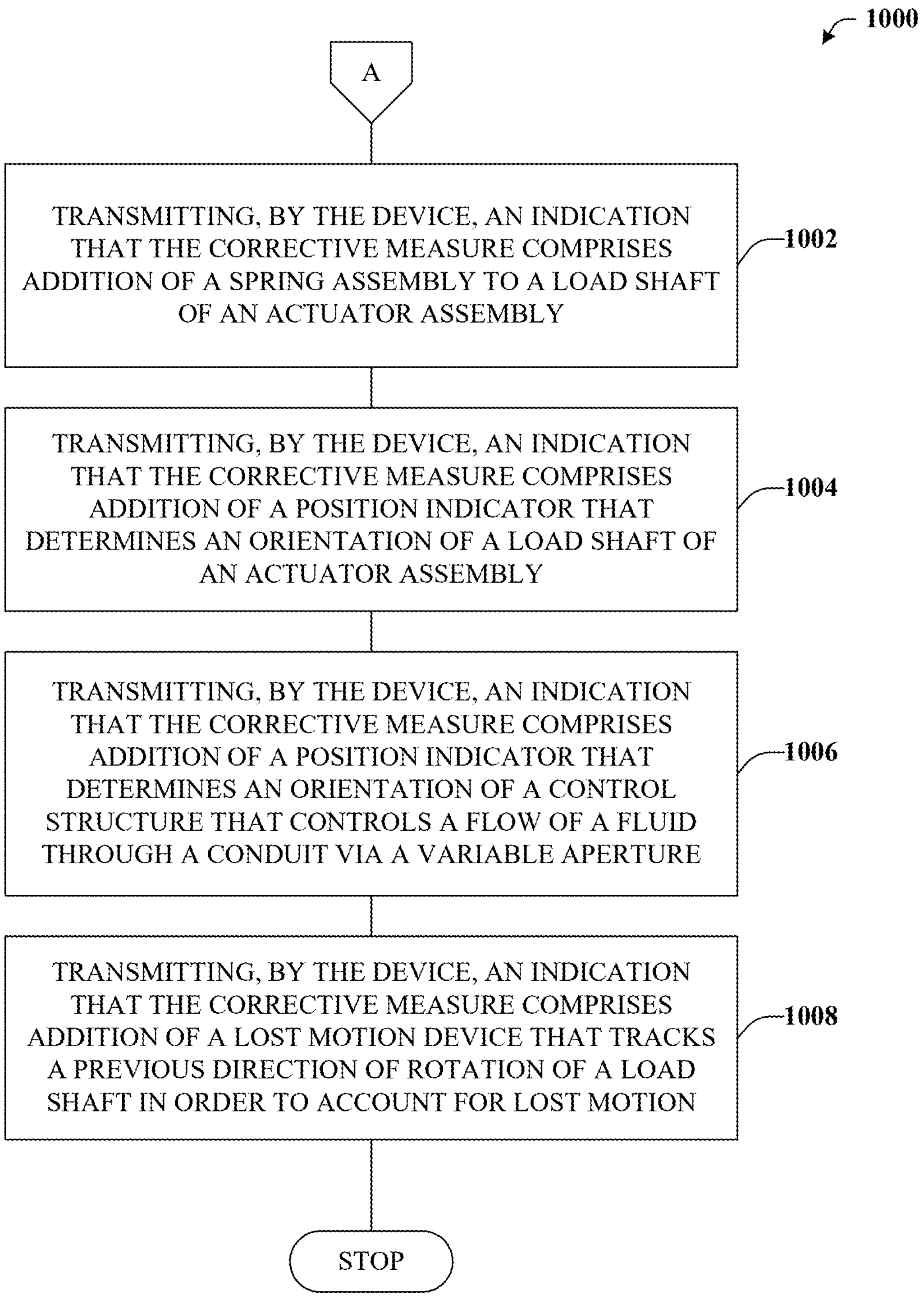
FIG. 10 illustrates an example method that can provide for one or more corrective measure recommendations in response to detection of the existence of lost motion for a fluid flow control device in accordance with certain embodiments of this disclosure.

FIGS. 9 and 10 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 9, exemplary method 900 is depicted. Method 900 can facilitate detection of the existence of lost motion and an amount of lost motion for a fluid flow control device in accordance with certain embodiments of this disclosure. While method 900 describes a complete method, in some embodiments, method 900 can include one or more elements of method 1000, reached via insert A, as discussed at FIG. 10.

At reference numeral 902, a device comprising at least one processor can determine that lost motion is exhibited in a gear train an actuator that controls a fluid flow control device. For example, the determination can be in response to lost motion detection procedure 810 detailed in connection with FIG. 8.

At reference numeral 904, the device can determine the amount of the lost motion that is exhibited in the gear train. The amount of lost motion can also be determined similar to that detailed with respect to lost motion detection procedure 810 of FIG. 8, as an example.

At reference numeral 906 in response to the above, the device can determine a corrective measure for mitigating the lost motion exhibited in the gear train. The corrective measure can, e.g., relate to mitigating the lost motion, avoiding the lost motion, or otherwise accounting for the lost motion. Method 900 can terminate in some embodiments, or, in other embodiments, proceed to insert A, which is further detailed in connection with FIG. 10.

Turning now to FIG. 10, exemplary method 1000 is depicted. Method 1000 can provide for corrective measure recommendations in response to detection of the existence of lost motion for a fluid flow control device in accordance with certain embodiments of this disclosure.

For example, at reference numeral 1002, the device introduced in connection with FIG. 9 that can be configured to facilitate detection of lost motion can further transmit an indicate that the corrective measure comprises addition of a spring assembly to the load shaft of an actuator assembly. As detailed herein, the spring assembly (e.g., spring assembly 614) can be configured to mitigate the lost motion.

Additionally or alternatively, at reference numeral 1004, the device can be configured to transmit an indication that the corrective measure comprises addition of a position indicator that determines an orientation of a load shaft of an actuator assembly. As detailed herein, a position indicator (e.g., position indicator 608B) that monitors or measures the load shaft can avoid or by-pass errors or deviation resulting from the lost motion.

Additionally or alternatively, at reference numeral 1006, the device can be configured to transmit an indication that the corrective measure comprises addition of a position indicator that determines an orientation of a control structure (e.g., fluid control structure 620 and/or damper 106) that controls a flow of a fluid through a conduit (e.g., duct 108) via a variable aperture (e.g., aperture(s) 114). As detailed herein, a position indicator (e.g., position indicator 608C) that monitors or measures the control structure can avoid or by-pass errors or deviation resulting from the lost motion.

Additionally or alternatively, at reference numeral 1008, the device can be configured to transmit an indication that the corrective measure comprises addition of a lost motion device that tracks a previous direction of rotation of a load shaft in order to account for lost motion. An example can be lost motion device 806 and/or device 800 of FIG. 8.

Assembly Spring Testing

FIGS. 11 and 12 relate to testing procedures that demonstrate the efficacy of an example spring assembly 614. FIG. 11 illustrates graph 1100 that plots a number of samples (e.g., x-axis) over a reported flow in (cubic feet per minute) CFM (y-axis) without using a spring assembly to mitigate lost motion errors. FIG. 12 illustrates graph 1200 that plots a number of samples over a reported flow in CFM while using a spring assembly to mitigate lost motion errors.

For both graphs 1100 and 1200, testing was conducted using a script that moves the control structure, in this case a damper blade, back and forth. The test involved first opening the damper and then closing it through the same data points. Plots 1102 and 1202 represent the data points observed when closing the damper by rotating the load shaft in a first direction, and plots 1104 and 1204 represent the same data points observed when opening the damper by rotating the load shaft in the opposite direction.

This setup allowed us to observe the spring's effect by applying its maximum torque to the closed position. The results show that hysteresis in CFM values is significantly reduced when the spring is used, compared to when no spring is present.

The impact of the spring setup on hysteresis can be explained by analyzing the backlash error versus damper opening. Although the backlash is consistent across the actuator's range, its effect is amplified when the damper is closing, leading to larger errors for lower CFM readings.

The equation used to compute the backlash error is derived as follows:

R1: Body radius.

C: Clearance between damper radius and body radius $$R2 = R1 - C$$

$$A1 = \mathrm{pi} * R1\wedge 2$$

A2 is the damper projected area, which is an ellipse with the minimum axis defined by theta, the opening angle.

$$A2 = \mathrm{pi} * R2 * b$$

$$b = R2 * \cos(\mathrm{Theta})$$

$$A2 = \mathrm{pi} * R2\wedge 2 * \cos(\mathrm{Theta})$$

$$A = A1 - A2$$

$$A = \mathrm{pi} * R1\wedge 2 - \mathrm{pi} * R2\wedge 2 * \cos(\mathrm{Theta})$$

$$A = \mathrm{pi} * (R1\wedge 2 - R2\wedge 2 * \cos(\mathrm{Theta}))$$

Example Backlash error calculation:

B: Backlash in degrees $$Aerror = (A(\mathrm{Theta} + B) - A(\mathrm{Theta})) / A(\mathrm{Theta}) * 100$$

$$Aerror = (\mathrm{pi} * (R1\wedge 2 - R2\wedge 2 * \cos(\mathrm{Theta} + B)) - \mathrm{pi} * (R1\wedge 2 - R2\wedge 2 * \cos(\mathrm{Theta}))) / \mathrm{pi} * (R1\wedge 2 - R2\wedge 2 * \cos(\mathrm{Theta})) * 100$$

$$Aerror = (R2\wedge 2 * (\cos(\mathrm{Theta} - \cos(\mathrm{Theta} + \mathrm{B}))) / (R1\wedge 2 - R2\wedge 2 * \cos(\mathrm{Theta})) * 100$$

Example Operating Environments

Figure 13:
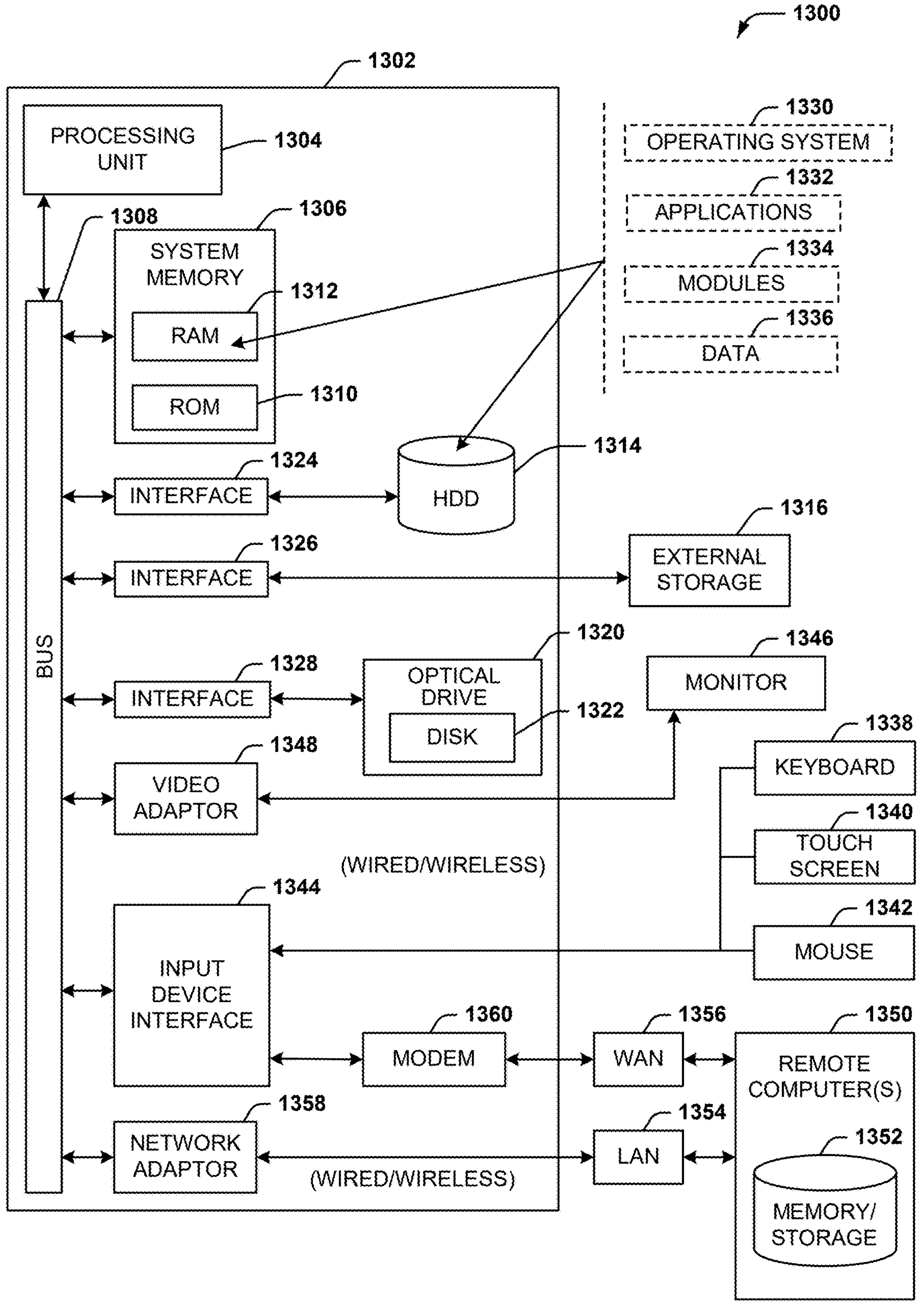
FIG. 13 illustrates an example block diagram of a computer operable to execute certain embodiments of this disclosure.

To provide further context for various example embodiments of the subject specification, FIG. 13 illustrates a block diagram of a computer 1302 operable to execute the disclosed storage architecture in accordance with example embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various example embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an example embodiment, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more example embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:

an actuator assembly that controls an orientation of a load shaft, wherein the orientation of the load shaft determines dimensions of at least one aperture of a fluid control device that controls a flow of a fluid through a conduit;

a motor axel coupled to a gear train having at least two gears comprising a first gear coupled to the motor axel and a second gear coupled to the load shaft;

a spring assembly coupled to the load shaft, the spring assembly comprising:

a spring that applies a bias to the load shaft in a first direction about the load shaft;

a processor; and a memory in communication with the processor, the memory having instructions that, when executed by the processor, cause the processor to perform operations comprising:

determining whether lost motion is exhibited in the gear train while the spring assembly is coupled to the load shaft;

in response to determining that lost motion is exhibited in the gear train, determining a corrective measure for mitigating the lost motion; and outputting an indication of the corrective measure.

2. The apparatus of claim 1, wherein determining whether lost motion is exhibited in the gear train comprises:

determining a first orientation associated with the load shaft at a target setting of the fluid control device when the target setting is reached by rotating the load shaft in a first rotational direction; and determining a second orientation associated with the load shaft at the target setting when the target setting is reached by rotating the load shaft in a second rotational direction opposite the first rotational direction.

3. The apparatus of claim 2, wherein determining whether lost motion is exhibited in the gear train further comprises determining whether the first orientation differs from the second orientation.

4. The apparatus of claim 3, wherein the operations further comprise determining an amount of the lost motion based on a difference between the first orientation and the second orientation.

5. The apparatus of claim 3, wherein the operations further comprise determining that lost motion is not exhibited in the gear train in response to the first orientation matching the second orientation.

6. The apparatus of claim 1, wherein the corrective measure comprises a recommendation to change a setting of the spring assembly to change a torque force applied by the spring to the load shaft.

7. The apparatus of claim 6, wherein the spring assembly comprises multiple selectable spring-retention locations, and wherein the setting identifies one of the multiple selectable spring-retention locations.

8. The apparatus of claim 6, wherein the spring assembly comprises:

a clamp device coupled to the load shaft; and a retaining bracket, and wherein changing the setting comprises securing an end of the spring at a different location of the clamp device or the retaining bracket.

9. The apparatus of claim 8, wherein the clamp device comprises multiple first orifices, each configured to secure a first end of the spring.

10. The apparatus of claim 8, wherein the retaining bracket comprises multiple second orifices, each configured to secure a second end of the spring.

11. The apparatus of claim 1, wherein the corrective measure comprises a recommendation to add a position sensor configured to measure an orientation of the load shaft.

12. The apparatus of claim 1, wherein the corrective measure comprises a recommendation to add a position sensor configured to measure an orientation of a control structure of the fluid control device.

13. The apparatus of claim 1, wherein the corrective measure comprises a recommendation to add a lost motion compensation device configured to account for an amount of the lost motion.

14. The apparatus of claim 1, wherein the bias applied by the spring in the first direction operates to increase the dimensions of the at least one aperture toward a fully open state of the fluid control device.

15. The apparatus of claim 1, wherein the bias applied by the spring in the first direction operates to decrease the dimensions of the at least one aperture toward a fully closed state of the fluid control device.

16. The apparatus of claim 1, wherein the bias applied by the spring is substantially constant between a fully open state and a fully closed state of the fluid control device.

17. The apparatus of claim 1, wherein the spring is a torsion spring.

18. The apparatus of claim 1, wherein the spring is at least one of a compression spring, an extension spring, a conical spring, a spiral spring, a Belleville spring, a leaf spring, a belt spring, a helical spring, a disc spring, or a grater spring.

19. The apparatus of claim 1, wherein the bias applied by the spring varies between a fully open state and a fully closed state of the fluid control device.

20. The apparatus of claim 1, wherein the actuator assembly is manufactured or designed for use with a variable air volume (VAV) device or another device not expected to accurately measure fluid flows below about 500 feet per minute.

21. The apparatus of claim 1, wherein the fluid control device comprises a variable orifice plate device configured to determine a flow of the fluid through the conduit based on the dimensions of the at least one aperture.

22. A method, comprising:

applying, by a spring assembly coupled to a load shaft of an actuator assembly, a bias to the load shaft in a first direction about the load shaft, wherein the actuator assembly controls an orientation of the load shaft, and wherein the orientation of the load shaft determines dimensions of at least one aperture of a fluid control device that controls a flow of a fluid through a conduit;

determining, by a device comprising a processor, whether lost motion is exhibited in a gear train of the actuator assembly while the spring assembly is coupled to the load shaft;

in response to determining that lost motion is exhibited in the gear train while the spring assembly is coupled to the load shaft, determining, by the device, a corrective measure for mitigating the lost motion; and outputting, by the device, an indication of the corrective measure.

23. The method of claim 22, wherein determining whether lost motion is exhibited in the gear train comprises:

determining a first orientation associated with the load shaft at a target setting of the fluid control device when the target setting is reached by rotating the load shaft in a first rotational direction;

determining a second orientation associated with the load shaft at the target setting when the target setting is reached by rotating the load shaft in a second rotational direction opposite the first rotational direction; and determining whether the first orientation differs from the second orientation.

24. The method of claim 23, further comprising determining, by the device, an amount of the lost motion based on a difference between the first orientation and the second orientation.

25. The method of claim 22, wherein determining the corrective measure comprises determining a recommendation to change a setting of the spring assembly to change a torque force applied by the spring assembly to the load shaft.

* * * * *